United States Patent Office.

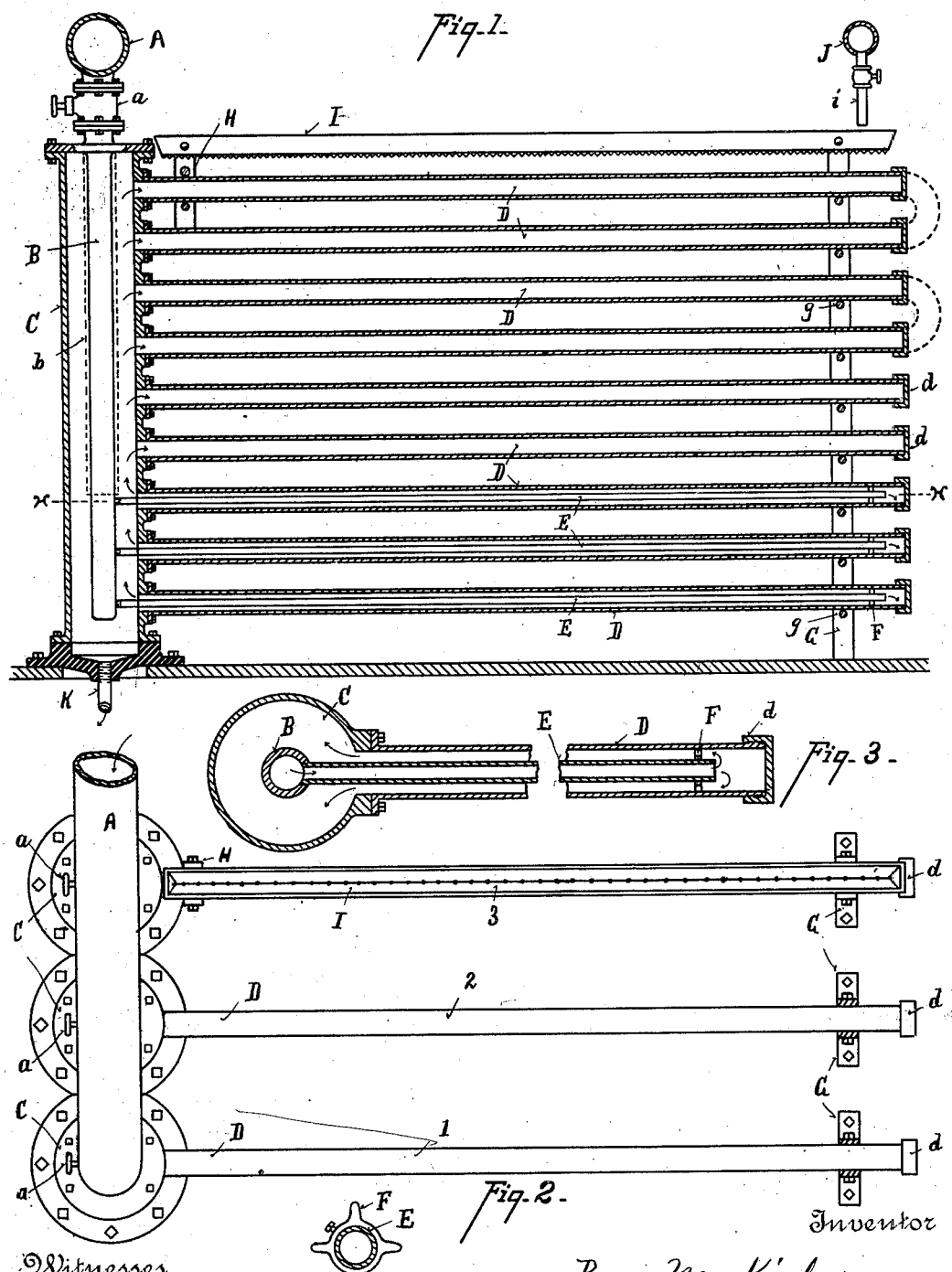

BEN M. KIRKER, OF CINCINNATI, OHIO.

SURFACE CONDENSER.

SPECIFICATION forming part of Letters Patent No. 663,677, dated December 11, 1900.

Application filed September 22, 1897. Serial No. 652,533. (No model.)

*To all whom it may concern:*

Be it known that I, BEN M. KIRKER, a citizen of the United States, residing at Cincinnati, in the county of Hamilton and State of Ohio, have invented certain new and useful Improvements in Surface Condensers, of which the following is a specification.

My invention relates to improvements in surface condensers, and is particularly adapted for steam-condensers or for ammonia-condensers in ice-machines.

One of the objects is to introduce the heated gas or steam first into the lower pipes of the condenser, where it is acted on by the partially-heated condensing-water after its passage over the upper pipes of the condenser.

Another object of my invention is to confine the deposit of lime and magnesia scale, when hard water is used for condensing purposes, to the lower pipes of the condenser.

Another object of my invention is to provide a condenser with as few joints as possible and so arranged that the several pipe-sections may be removed or replaced without disturbing the other sections, all of which will be more fully set forth in the description of the accompanying drawings, making a part of this specification, in which—

Figure 1 is a central vertical section through one of the sections of the condenser. Fig. 2 is a top plan view of a condenser composed of several sections. Fig. 3 is a detail view on line *x x*, Fig. 1. Fig. 4 is a detail view of a bracket-support for the inner pipe.

In Figs. 1 and 2, A represents a pipe or horizontal manifold through which the gas or steam is supplied to the condenser. B represents a series of branch pipes from the manifold A, projecting down into the upright manifolds C and closed at the lower end. D represents the condenser-pipes, of which a series are secured to flanged openings on the sides of the manifolds C, the opposite end of the pipes D being closed by caps *d*, or the pipes may be bent to a U-form, as indicated in dotted line, Fig. 1, and both ends of the pipe secured to flanged openings of the manifold C. Gas or steam is admitted to the condenser-pipes from pipe B by means of pipes E, centrally located in all, or preferably only in the lower three or four, of the condenser-pipes. One end of the pipes E taps the pipe B, while the opposite end discharges the hot gas or steam into the outer end of the condenser-pipes, which it traverses under the action of the condensing-water and emerges partially cooled into the manifold C, whence it enters one of the upper condenser-pipes, where it is acted upon by the fresh cool water and finally condensed. F represents brackets on the end of pipes E to support them centrally within the pipes D. G represents supports for the outer ends of the condenser-pipes. *g* represents clamping-bolts. I represents water-troughs supplied from a pipe or manifold J, through branch pipes *i*, with water which drips from the troughs over the condenser-pipes. H represents a bracket supporting the opposite end of the trough.

In Fig. 3 I have shown three sections 1 2 3, each provided with a manifold C and receiving gas or steam from a common supply-pipe A, as many sections as desired being connected in series. *a* represents valves by means of which the gas may be shut off from each section independently for repairs or other purposes. K represents drain-pipes, through which the products of condensation are drained into the receiver. At *b*, Fig. 1, I have shown in dotted lines an insulated covering for the upper portion of pipe B, which is preferably employed.

In the modification shown in Fig. 5 the pipes B and E are omitted, the gas being admitted from manifold A, through valves *a'*, into a manifold B', whence it enters the outer ends of the lower pipes D and passes to the manifold C, being partially cooled in its passage. The gas then rises in the manifold and enters the upper pipes D, where it is condensed, the products of condensation draining into manifold C and passing through pipe K to the receiver.

Where hard water is employed on the condenser, the water is heated near the top of the condenser. The lime and other scale-forming materials are precipitated and, dripping down, form a thick non-conducting scale on all the pipes, which is difficult to remove. By the use of condenser herein shown the water is not heated enough to form a scale until it reaches the lower pipes, where the hot gas is introduced, thereby permitting the pipes to be much more readily cleaned.

It will be observed that my condenser is formed with a minimum number of joints and that each pipe may be detached and replaced without disturbing the other pipes.

It is obvious that a second series of condenser-pipes may be secured upon the opposite sides of the manifolds C, if desired. Also that where only one manifold C is employed three or more series of pipes D may be secured radially to said manifold.

Having described my invention, what I claim is—

1. In a surface condenser, a horizontal supply-manifold; a series of vertical manifolds, each provided with condenser-pipes, said pipes being connected to the vertical manifolds, and closed at their opposite end; independent valve-controlled supply-pipes supplying hot gas from the horizontal manifold to the outer end of the lower condenser-pipes, whereby the several vertical manifolds may be independently cut out of the condenser for repairs, and the cool condensing-water acts first on the partially-cooled gas and finally on the hot gas, preventing the deposit of scale from the condensing-water upon the condenser-pipes, substantially as specified.

2. A surface condenser composed of an upright manifold having an exit-pipe near the bottom for drawing off the products of condensation; a supply-pipe tapping one end of the upright manifold and extending vertically within the manifold; a series of condenser-pipes secured at one end to the upright manifold, being closed at the other end, and projecting substantially horizontally from the upright manifold; and a series of smaller pipes leading from the supply-pipe within the manifold to the outer ends of the lower condenser-pipes; and means substantially as shown for supplying cooling-water to the exterior of the condenser-pipes, substantially as specified.

In testimony whereof I have hereunto set my hand.

BEN M. KIRKER.

Witnesses:
C. W. MILES,
A. LAVELL.